(12) United States Patent
Sugiyama

(10) Patent No.: US 6,798,835 B2
(45) Date of Patent: Sep. 28, 2004

(54) APPARATUS AND METHOD OF SWITCHING MOVING-PICTURE BITSTREAM

(75) Inventor: Kenji Sugiyama, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 681 days.

(21) Appl. No.: 09/816,335

(22) Filed: Mar. 26, 2001

(65) Prior Publication Data

US 2002/0031183 A1 Mar. 14, 2002

(30) Foreign Application Priority Data

Mar. 29, 2000 (JP) ........................................ 2000-090606

(51) Int. Cl.⁷ ............................. H04B 1/66; H04N 7/12
(52) U.S. Cl. ............................ 375/240.12; 375/240.02; 375/240.15; 375/240.26
(58) Field of Search .......................... 375/240, 240.25, 375/240.02, 240.07, 240.08, 240.12, 240.15, 240.16, 240.26; 348/699, 700, 701

(56) References Cited

U.S. PATENT DOCUMENTS 6,091,460 A * 7/2000 Hatano et al. .............. 348/699
6,314,138 B1 * 11/2001 Lemaguet ................... 375/240
6,351,564 B1 * 2/2002 Martin ........................ 382/233
6,678,332 B1 * 1/2004 Gardere et al. ......... 375/240.26

FOREIGN PATENT DOCUMENTS

JP 11-167767 6/1999

* cited by examiner

Primary Examiner—Chris Kelley
Assistant Examiner—Erick Rekstad
(74) Attorney, Agent, or Firm—Jacobson Holman PLLC

(57) ABSTRACT

Moving-picture bitstreams are switched at a predetermined switching timing to form a successive moving-picture bitstream. Each bitstream carries first pictures to be used as reference pictures for inter-picture prediction and second pictures other than the first pictures. Buffer occupancy indicator at decoder buffer is obtained on each picture carried by the successive moving-picture bitstream. A difference in buffer occupancy just before and just after the switching timing is obtained based on the buffer occupancy data to set a decimation rate and a decimation period on the second pictures so that the difference in buffer occupancy just before and just after the switching timing becomes small. The second pictures only are decimated from the successive moving-picture bitstream at the decimation rate within the decimation period, thus obtaining an output moving-picture bitstream having an adjusted buffer occupancy in accordance with the decimation.

4 Claims, 3 Drawing Sheets

APPARATUS AND METHOD OF SWITCHING MOVING-PICTURE BITSTREAM

BACKGROUND OF THE INVENTION

The present invention relates to an apparatus and a method of switching moving-picture bitstreams that have been coded to a small amount of codes by highly efficient coding, such as, MPEG-coding with inter-picture predictive coding for efficient video data transfer, storage and displaying.

Moving-picture bitstreams are switched in digital TV broadcasting or video data transfer, according to change in TV programs or content of data to be transferred. These systems require multiplexing (switching) of moving-picture bitstreams into one bitstream in edition. The edited bitstream requires high-fidelity decoding.

Pictures under MPEG-coding are divided into three different types I-, P- and B-pictures. I-pictures (intra-coded pictures) are coded independently, entirely without reference to other pictures. P-pictures (unidirectionally predictive-coded pictures) are compressed by coding the differences the pictures and reference preceding I- or P-pictures. B-pictures (bidirectionally predictive-coded pictures) are also compressed by coding the differences the pictures and reference preceding or upcoming I- or P-pictures. B-pictures are not used as reference pictures.

Inter-picture predictive coding requires an output buffer to follow a big difference in amount of codes generated for each picture. Coding is controlled so that a generated code amount becomes adequate for the buffer storage capacity, thus buffer occupancy being changed for each group of pictures.

Bitstream switching is performed so that the bitstream just after switching starts with an I-picture.

Switching of sequential two bitstreams generated by inter-picture predictive coding results in that the code amount overflowing or underflowing the buffer because the last buffer occupancy for the anterior bitstream and the initial buffer occupancy for the posterior bitstream at the switching timing are different from each other.

The difference in buffer occupancy is compensated for by inputting stuff data to increase an effective code amount or by inserting empty frames to decrease an effective code amount. The former technique does not affect reproduced pictures whereas the latter causes reproduction of no pictures for a period corresponding to empty frames.

Empty frames are mostly inserted at a bitstream-switching timing because the posterior bitstream starts with an I-picture of large amount of codes.

A well-known bitstream-switching apparatus switches MPEG-2 bitstreams "A" and "B", using a blank inserter and a blank controller.

Suppose that each of the input bitstreams "A" and "B" carries 480 p(progressive)-pictures (720×480 pixels, about 60 frames per second) coded for every sixth-frame period of P(I)-pictures by MPEG-2 inter-picture predictive coding.

The input bitstreams "A" and "B" are supplied to the bitstream-switching apparatus and switched from the bitstream "A" to "B" at a predetermined timing. The switching timing is decided so that the anterior bitstream "A" is switched at the end of a P-picture to the posterior bitstream "B" starting with an I-picture, otherwise causing problems in inter-picture prediction for reproduction.

The switching is thus performed with detection of frame period and picture type to meet such requirement for switching timing, as illustrated in FIG. 1.

The output bitstream after switching has displacement of several frames at the switching timing, thus resulting in difference in buffer occupancy at the switching timing to cause overflowing or underflowing decoder buffer.

To avoid such difference in buffer occupancy, the output bitstream after switching is supplied to a blank inserter for inserting stuff bits or empty frames to the output bitstream in accordance with control data sent by a blank controller.

Stuff bits increase the number of bits for each predetermined reproduction period but will not be used in decoding. On the contrary, empty frames carrying no video data decrease the number of bits for each predetermined reproduction period. Insertion of empty frames causes delay in bitstream reproduction timing.

The amount of codes controlled by insertion of stuff bits or empty frames corresponds to the storage capacity of an output buffer. The storage capacity usually corresponds to the amount of bits to be transferred for about 0.2 to 0.5 seconds.

Therefore, insertion of stuff bits or empty frames sometimes causes no reproduction of pictures for about 0.2 to 0.5 seconds at maximum.

The bitstream processed by the blank inserter is supplied to an output buffer. The buffer stores the intermittently input bitstream and outputs it at a predetermined transfer bit rate. The buffer further detects change in amount of codes of the bitstream to send code amount data to the blank controller.

The bitstream after switching as described above is further supplied to a multiplexed-bitstream separator. The separator obtains buffer occupancy BO that is set as video buffering verifier VBV in MPEG, for each frame of the bitstream.

The BO data is supplied to the blank controller. Based on the BO data, the controller detects the displacement of frames at the switching timing. The controller sends control data in accordance with the displacement of frames to the blank inserter.

The inserter inserts stuff bits or empty frames to the bitstream after switching in accordance with the control data until the displacement of frames is cancelled, as illustrated in FIG. 2.

In FIG. 2, buffer occupancy BO is illustrated only at frame change. Buffer occupancy BO indicates decoder-buffer occupancy BO according to the MPEG standard. Thus, the larger the amount of codes for each frame, the lower the BO whereas the smaller the amount of codes for each frame, the higher the BO. The change in BO when raised becomes maximum with respect to transfer bit rate.

The bitstreams "A" and "B" have their own BO values which causes difference in buffer occupancy when switched according to the requirement for switching timing which is discussed above.

Insertion of empty frames to the bitstream at the switching timing promotes increase in buffer occupancy with respect to transfer bit rate due to no code amount for the empty frames.

Empty frames are inserted in unit of frame while stuff bits are inserted in unit of picture portion smaller than a frame so that there is a small difference in buffer occupancy as small as possible for the successive bitstreams "A" and "B".

In FIG. 2, at the switching timing, the last buffer occupancy BO for the anterior bitstream "A" is indicated by the sign "a" and the initial buffer occupancy BO for the posterior bitstream "B" is indicated by the sign "b". The difference in buffer occupancy for the successive bitstreams "A" and "B" at the switching timing is expressed as "b-a".

Buffer occupancy for the bitstream "B" after switching becomes lower than "b" for the input bitstream "B" before switching by (b-a). In FIG. 2, buffer occupancy at a portion "c" of the input bitstream "B" is lowered to that at a portion "d" of the bitstream "B" after switching, thus underflowing the decoder buffer.

Several empty frames that correspond to the BO difference (b-a) are inserted into the output bitstream after switching to make less the BO difference.

Buffer occupancy at the portion "d" of the bitstream "B" before empty frame insertion is then raised to that at a portion "e" of the bitstream "B" after empty frame insertion, or returned to that at the portion "c", thus change in code amount before and after switching becoming small for the storage capacity of the decoder buffer.

Insertion of empty frames for making small the difference in buffer occupancy at the switching timing, however, causes delay in reproduction start timing for the posterior bitstream "B".

Such delay results in no pictures to be decoded after the switching timing for a period that corresponds to the inserted empty frames, thus causing discontinuity in moving picture when reproduced.

SUMMARY OF THE INVENTION

A purpose of the present invention is to provide an apparatus and a method of switching moving-picture bitstreams with no discontinuity in moving picture after switching.

The present invention provides a bitstream switching apparatus for switching a plurality of incoming moving-picture bitstreams each carrying first pictures to be used as reference pictures for inter-picture prediction and second pictures other than the first pictures, at a predetermined switching timing, to form a successive moving-picture bitstream, the apparatus including: a data separator to obtain buffer occupancy indicator at decoder buffer on each picture carried by the successive moving-picture bitstream; a decimation controller to obtain a difference in buffer occupancy just before and just after the switching timing based on the buffer occupancy data to set a decimation rate and a decimation period on the second pictures so that the difference in buffer occupancy just before and just after the switching timing becomes small; and bitstream decimator to decimate the second pictures only from the successive moving-picture bitstream at the decimation rate within the decimation period, thus obtaining an output moving-picture bitstream having an adjusted buffer occupancy in accordance with the decimation.

Moreover, the present invention provides a bitstream switching method for switching a plurality of incoming moving-picture bitstreams each carrying first pictures to be used as reference pictures for inter-picture prediction and second pictures other than the first pictures, at a predetermined switching timing, to form a successive moving-picture bitstream. Buffer occupancy data is obtained on each picture carried by the successive moving-picture bitstream. A difference in buffer occupancy just before and just after the switching timing is obtained based on the buffer occupancy data to set a decimation rate and a decimation period on the second pictures so that the difference in buffer occupancy just before and just after the switching timing becomes small with respect to storage capacity of a buffer for storing the successive moving-picture bitstream. The second pictures only are decimated from the successive moving-picture bitstream at the decimation rate within the decimation period, thus obtaining an output moving-picture bitstream having buffer occupancy adequate for the storage capacity of the buffer.

DETAILED DESCRIPTION OF PREFERRED EMBODIMENTS

Preferred embodiments according to the present invention will be disclosed with reference to the attached drawings.

A concept of the present invention is that bitstreams of pictures that will not be used as reference pictures, or B-pictures in MPEG, are decimated (the amount of codes for the pictures is decreased) over the switching timing to make small the difference in buffer occupancy at the switching timing.

Bitstreams of pictures that will be used as reference pictures, or P- and I-pictures in MPEG, therefore remain by this picture decimation even though a picture rate is lowered for the decimated pictures, thus achieving continuity in moving picture when reproduced after the switching timing.

Moreover, according to the present invention, bitstreams of pictures that will not be used as reference pictures are decimated at low motion activity, thus achieving smooth movement of moving picture on screen, which would otherwise be not smooth due to picture decimation.

First Embodiment of Moving-Picture Bitstream Switching Apparatus

Figure 3:
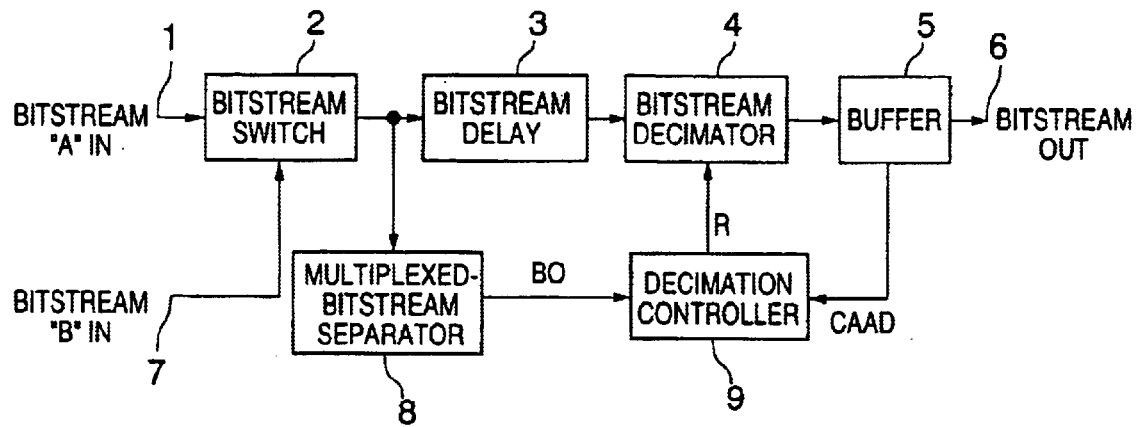
FIG. 3 shows a block diagram of the first preferred embodiment of a moving-picture bitstream switching apparatus according to the present invention.

FIG. 3 shows a block diagram of the first preferred embodiment of a moving-picture bitstream switching apparatus according to the present invention.

In FIG. 3, moving-picture bitstreams "A" and "B" are supplied to a bitstream switch 2 through input terminals 1 and 7, respectively.

In the embodiment, each of the input bitstreams "A" and "B" carries 480 p(progressive)-pictures (720×480 pixels, about 60 frames per second) coded for every sixth-frame period of P(I)-pictures by MPEG-2 inter-picture predictive coding.

The input bitstream "A" is switched by the bitstream switch 2 to the bitstream "B" at an externally given predetermined timing. The switching timing is decided so that the anterior bitstream "A" is switched at the end of a P-picture to the posterior bitstream "B" starting with an I-picture, otherwise causing problems in inter-picture prediction for reproduction.

Figure 1:
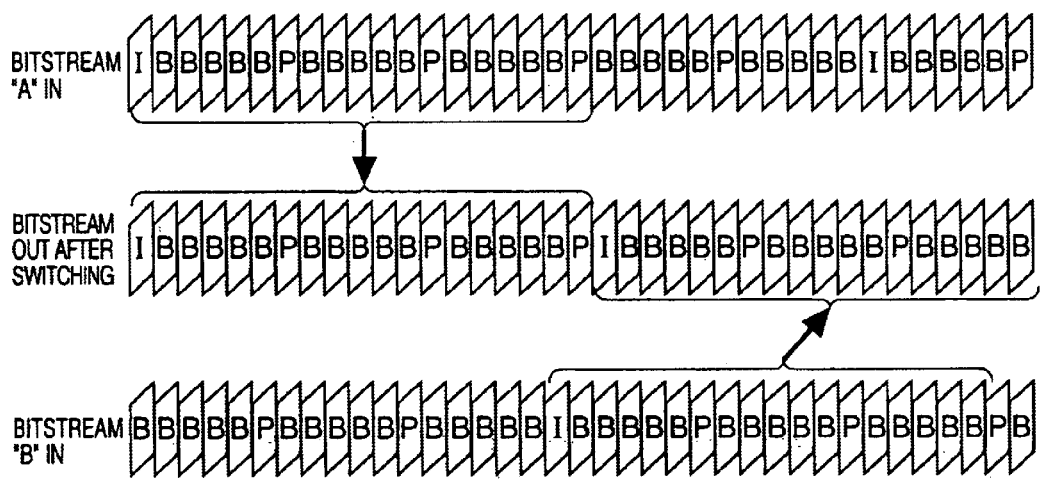
FIG. 1 illustrates switching from a bitstream to another bitstream both carrying I-, P- and B-pictures.
Figure 2:
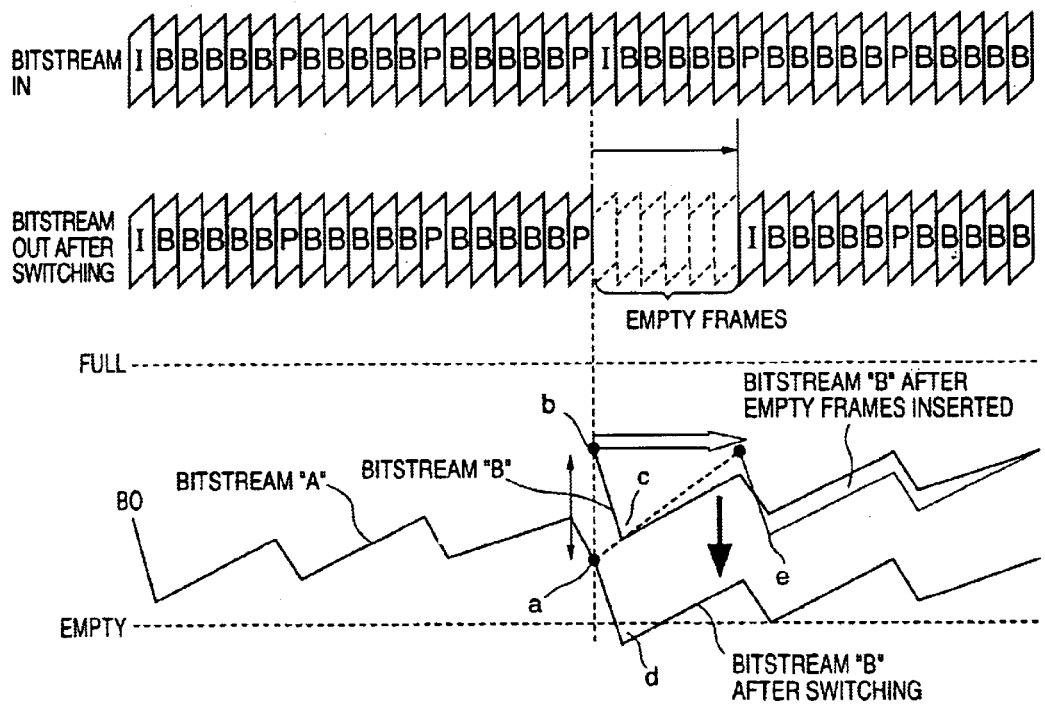
FIG. 2 illustrates well-known empty frame insertion and the resultant change in buffer occupancy.

The switching is thus performed with detection of frame period and picture type to meet such requirement for switching timing, as illustrated in FIG. 1. The bitstream after switching has displacement of several frames at the switching timing, the same as discussed for the well-known apparatus.

The bitstream after switching is supplied to a bitstream delay unit 3. The bitstream has, however, difference in buffer occupancy at the switching timing, thus causing overflowing or underflowing decoder buffer, the same as discussed for the well-known apparatus.

To avoid such difference in buffer occupancy, according to the present invention, the bitstream delay unit 3 delays the bitstream by about 10 to 20 frames and supplies it to a bitstream decimator 4 that decimates bitstreams of B-pictures.

Since the bitstream has been delayed, B-picture frames before and also after the switching timing are decimated, for example, for every second B-picture frame (decimation rate) for a picture rate R of 30 fps (frame per second).

Change in picture rate from 60 fps for the input bitstreams "A" and "B" to 30 fps by decimation causes difficulty in smoothness of motion on screen a little bit for rapidly moving pictures, however, not for most moving pictures.

Moreover, the bitstreams are mostly switched at scene change, thus difficulty in motion smoothness over the switching timing due to decimation is unnoticeable.

Such difficulty is particularly unnoticeable for about 0.1 seconds just after scene change. Therefore, the decimation rate can be raised to 20 fps or 10 fps for 0.1 seconds just after switching.

Figure 4:
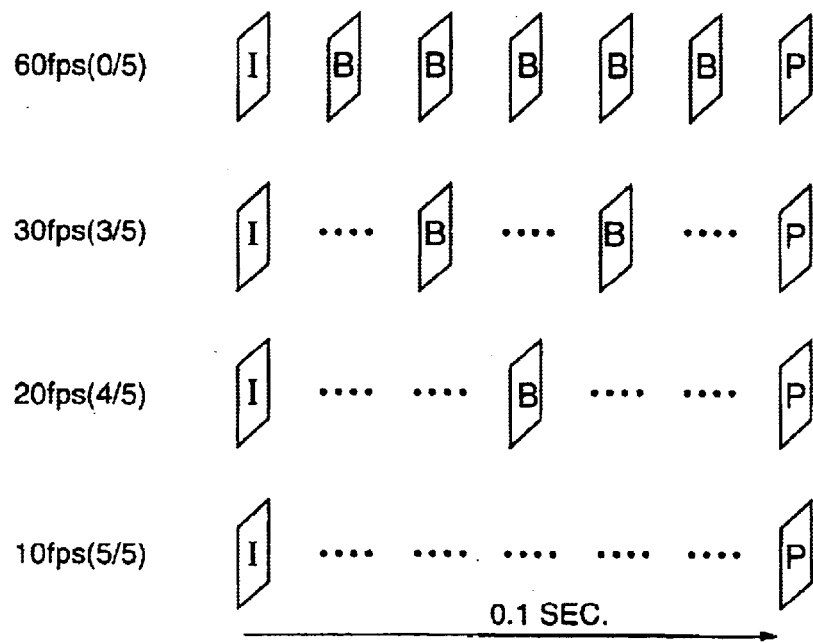
FIG. 4 illustrates B-picture frame decimation at several decimation rates.

Decimation of B-picture frames at several decimation rates is illustrated in FIG. 4.

B-picture frames only are decimated so that P(I)-picture frames and the remaining B-picture frames are located at a constant interval as follows:

At a decimation rate 60 fps (0/5), no B-picture frames are decimated from a bitstream for 0.1 seconds.

At a decimation rate 30 fps (3/5), three B-pictures are decimated from a bitstream for 0.1 seconds.

At a decimation rate 20 fps (4/5), four B-pictures are decimated from a bitstream for 0.1 seconds.

Moreover, at a decimation rate 10 fps (5/5), all (five) B-pictures are decimated from a bitstream for 0.1 seconds.

The bitstream from which B-picture frames have been decimated is supplied to a buffer 5 in FIG. 3.

The buffer 5 stores intermittently input bitstream and outputs it at a predetermined transfer rate through an output terminal 6. The buffer 5 also detects buffer occupancy, or an amount of codes decreased due to decimation, and sends data on code amount after decimation (CAAD) to a decimation controller 9.

The decimation controller 9 controls a period of B-picture decimation by deciding a decimation starting point according to the difference in buffer occupancy at the switching timing.

Decimation starts early when the difference in buffer occupancy is large for underflowing and the amount of codes required to be decreased is large. Decimation can start early at most for the frames that have been delayed by the bitstream delay unit 3. On the other hand, decimation starts before the switching timing when difference in buffer occupancy is small.

Decimation continues until the difference in buffer occupancy between the input bitstream "B" and that after decimated is small enough for the storage capacity. Or, it is not performed when no amount of codes should be decreased.

Decimation is performed in unit of frame while stuff bits are inserted in unit of picture portion smaller than a frame so that there is a small difference in buffer occupancy as small as possible for the successive bitstreams "A" and "B" over the switching timing.

The bitstream output by the bitstream switch 2 is further supplied to a de-multiplexer 8.

The de-multiplexer 8 obtains buffer occupancy BO that is set as video buffering verifier VBV in MPEG, for each frame of the bitstream.

The BO data is supplied to the decimation controller 9. Based on the BO data, the controller 9 detects the displacement of frames at the switching timing. The controller sets a decimation rate (R) based on the frame displacement and sends the decimation rate (R) to the bitstream decimator 4. Moreover, based on the data on code amount after decimation (CAAD) sent from the buffer 5, the controller 9 controls the decimator 4 to continue decimation until the difference in buffer occupancy between the input bitstream "B" and that after decimation becomes small, or compensated for, with respect to the storage capacity.

Figure 5:
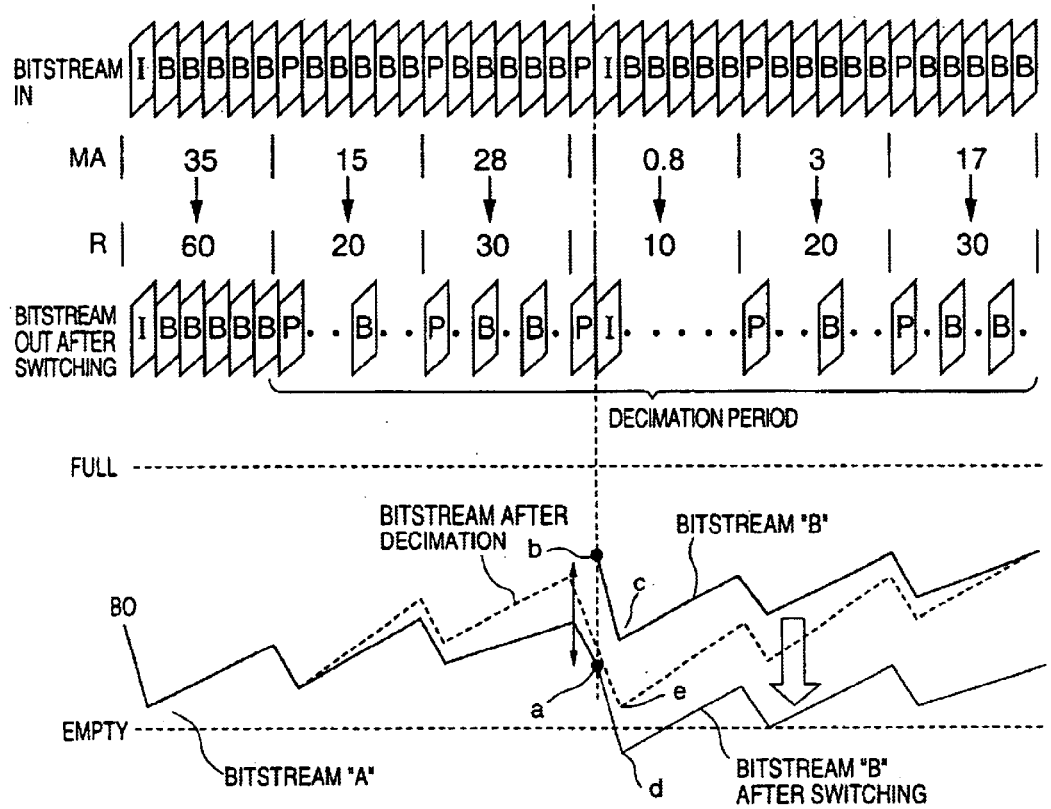
FIG. 5 illustrates picture decimation and the resultant change in buffer occupancy according to the present invention, for both first and second embodiments.

Buffer occupancy compensation by decimation control is illustrated in FIG. 5.

Motion activity MA illustrated in FIG. 5 is not used in the first embodiment but used in the second embodiment which will be disclosed later.

In FIG. 5, buffer occupancy BO is illustrated only at frame change. Buffer occupancy BO indicates decoder-buffer occupancy BO according to the MPEG standard. Thus, the larger the amount of codes for each frame, the lower the BO whereas the smaller the amount of codes for each frame, the higher the BO.

At the switching timing, the last buffer occupancy BO for the anterior bitstream "A" is indicated by the sign "a" and the initial buffer occupancy BO for the posterior bitstream "B" is indicated by the sign "b". The difference in buffer occupancy for the successive bitstreams "A" and "B" at the switching timing is expressed as "b-a".

Buffer occupancy for the bitstream "B" after switching becomes lower than "b" for the input bitstream "B" before switching by (b-a). In FIG. 5, buffer occupancy at a portion "c" of the input bitstream "B" is lowered to that at a portion "d" of the bitstream "B" after switching, thus underflowing the output buffer.

The difference (b-a) in buffer occupancy at the switching timing is obtained by the decimation controller 9 to set a decimation rate that is sent to the bitstream decimator 4.

The decimator 4 starts decimation at a portion of the bitstream "A" before switching and continues decimation until the difference in buffer occupancy over the switching timing becomes small, or compensated for, with respect to the storage capacity of the decoder buffer, based on the data on code amount after decimation sent from the buffer 5 via the controller 9.

Buffer occupancy at the portion "d" of the bitstream "B" before decimation is then raised to that at a portion "e" of the bitstream "B" after decimation, thus change in code amount before and after switching becoming small for the bitstream composed of successive bitstreams of "A" and "B" with respect to the storage capacity of the decoder buffer.

B-picture decimation according to the present invention does not generate bitstream portions of no code amount because no empty frames are inserted different from the well-known apparatus.

Therefore, a period for B-picture decimation is set longer than that for empty frame insertion. When the displacement of frames at the switching timing corresponds to a code amount to be transferred for 0.1 seconds, empty frames are inserted for 0.1 seconds for the well-known apparatus whereas B-picture frames are decimated in this embodiment for about 0.4 seconds, four times longer than 0.1 seconds because an amount of codes to be decreased in the embodiment is about 25% of that decreased by the well-known apparatus.

Decimation of B-picture frames starts before the switching timing in the embodiment, so that buffer occupancy compensation has progressed at the switching timing. However, this embodiment could generate underflowing the buffer 5 after the switching timing because insufficient amount of codes might have been decreased before the switching timing.

To avoid such a problem, this embodiment can also perform insertion of empty frames. The number of empty frames are, however, much fewer than the well-known apparatus because of B-picture decimation starting before the switching timing.

Second Embodiment of Moving-Picture Bitstream Switching Apparatus

Figure 6:
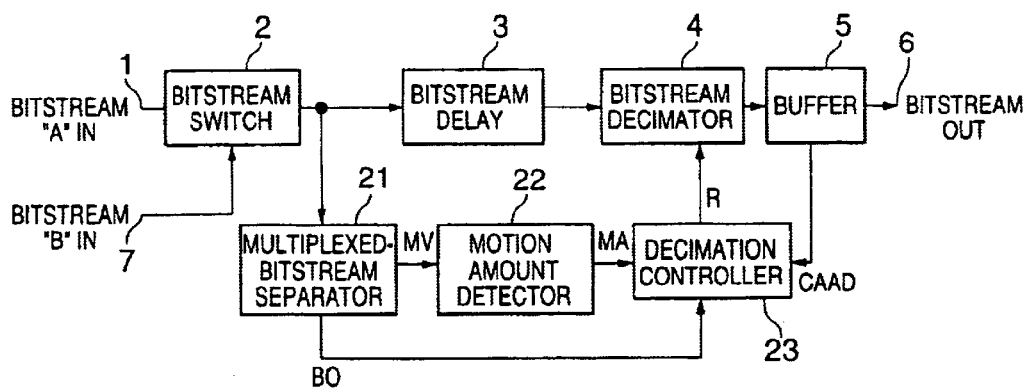
FIG. 6 shows a block diagram of the second preferred embodiment of a moving-picture bitstream switching apparatus according to the present invention.

FIG. 6 shows a block diagram of the second preferred embodiment of a moving-picture bitstream switching apparatus according to the present invention.

Elements in this embodiment that are the same as or analogous to elements in the first embodiment (FIG. 3) are referenced by the same reference numbers and will not be explained in detail.

A de-multiplexer separator 21 in this embodiment obtains buffer occupancy and also motion vectors (MV) to be used for inter-picture prediction on the bitstream sent by the bitstream switch 2.

The MV data is supplied to a motion amount detector 22 for detecting motion activity.

The motion amount detector 22 detects motion activity based on the incoming MV data. The detected motion activity is supplied to the decimation controller 23. Motion activity detection is performed per 0.1 seconds for each segment between a P-picture and the next P-picture.

The motion vector used for motion activity detection is a motion vector used for P-picture prediction. In detail, motion activity is detected by using a horizontal component MVx (i, j) and a vertical component MVy (i, j) of a motion vector used for P-picture coding in which "i" and "j" indicate horizontal and vertical positions, respectively, on one frame when movement of one pixel is 1.0.

Motion activity MA for the entire frame is obtained according to the following equation.

$$MA = \left( \sum_{i=0}^{44} \sum_{j=0}^{29} MVx(i, j)^2 + MVy(i, j)^2 \right) / 1350$$

However, for intra-coded blocks such as I- and P-pictures with no motion vector, the motion amount detector 22 applies distance compensation to a motion vector of the preceding B-picture to obtain a relatively large motion vector for an I-picture, for example, to obtain motion activity, because intra-code blocks often carry moving picture of rapid movement.

The decimation controller 23 controls the bitstream decimator 4 to perform decimation or not. Moreover, the controller 23 decides a picture rate R (decimation rate) based on the MV data. The picture rate R is supplied to the decimator 4 to perform decimation at the picture rate R.

A moving-picture video signal mostly carries 60 frames (or fields) according to a limit on detection of a flicker on screen, however, such number of frames (or fields) are not always required for every moving picture. For example, cinema films require 24 frames per second (fps), so that un-smooth movement (jaggy movement, etc.) is noticeable only for rapidly moving scenes at 30 fps, however, not noticeable at 20 fps whereas noticeable at 10 fps except stationary scenes.

Therefore, picture rate (decimation rate) control in which the rate is switched among 60 fps only for rapid movement, 30 fps for frequent movement, 20 fps for infrequent movement, and 10 fps for almost stationary scenes offers smooth and natural movement on screen when moving pictures are reproduced.

The picture rate R is decided based on the following relationship with the motion activity MA.

R=60 fps . . . 64<MA
R=30 fps . . . 8<MA≦64
R=20 fps . . . 1<MA≦8
R=10 fps . . . MA≦1

The number of B-pictures to be decimated in the second embodiment is larger than that in the first embodiment because segments having a small MA to be subjected to lower a picture rate (decimation rate) mostly have a small amount of codes for B-pictures.

The decimation control in the second embodiment using motion activity MA is illustrated in FIG. 5.

The output bitstream of the bitstream switch 2, after switching, is subjected to B-picture frame decimation by the bitstream decimator 4 based on the picture rate (decimation rate) R set in accordance with the motion activity MA within a decimation period.

As illustrated with a thick dotted line in FIG. 5, the buffer occupancy is compensated for by B-picture decimation so that the bitstreams "A" and "B" are connected as a successive bitstream at the switching timing. The bitstreams "A" and "B" remain unchanged except the decimation period.

As disclosed above, according to the present invention, a difference in buffer occupancy on a moving-picture bitstream at a switching timing is compensated for by decimating bitstreams of pictures over switching timing, that will not be used as reference pictures, such as B-pictures in MPEG, thus continuous moving picture being reproduced after the switching timing.

Therefore, the present invention achieves switching of moving-picture bitstreams with smooth movement of moving picture like a usual scene change, without buffer-overflwoing/underflowing and discontinuity in moving picture.

Moreover, the present invention performs picture decimation using motion activity, thus achieving smooth moving picture reproduction.

Moving-picture bitstreams are mostly switched at scene change, thus difficulty in motion smoothness over the switching timing due to decimation is unnoticeable. According to the invention, however, such difficulty in motion smoothness over the switching timing is further unnoticeable by decimation using motion activity.

What is claimed is:

1. A bitstream switching apparatus for switching a plurality of incoming moving-picture bitstreams each carrying first pictures to be used as reference pictures for inter-picture prediction and second pictures other than the first pictures, at a predetermined switching timing, to form a successive moving-picture bitstream, the apparatus comprising:

a data separator to obtain buffer occupancy indicator at decoder buffer on each picture carried by the successive moving-picture bitstream;

a decimation controller to obtain a difference in buffer occupancy just before and just after the switching timing based on the buffer occupancy data to set a decimation rate and a decimation period on the second pictures so that the difference in buffer occupancy just before and just after the switching timing becomes small; and bitstream decimator to decimate the second pictures only from the successive moving-picture bitstream at the decimation rate within the decimation period, thus obtaining an output moving-picture bitstream having an adjusted buffer occupancy in accordance with the decimation.

2. The bitstream switching apparatus according to claim 1 further comprising a motion amount detector to detect motion activity on the successive moving-picture bitstream, the motion activity being supplied to the decimation controller and used for setting the decimation rate.

3. A bitstream switching method for switching a plurality of incoming moving-picture bitstreams each carrying first pictures to be used as reference pictures for inter-picture prediction and second pictures other than the first pictures, at a predetermined switching timing, to form a successive moving-picture bitstream, comprising the steps of:

obtaining buffer occupancy data on each picture carried by the successive moving-picture bitstream;

obtaining a difference in buffer occupancy just before and just after the switching timing based on the buffer occupancy data to set a decimation rate and a decimation period on the second pictures so that the difference in buffer occupancy just before and just after the switching timing becomes small with respect to storage capacity of a buffer for storing the successive moving-picture bitstream; and decimating the second pictures only from the successive moving-picture bitstream at the decimation rate within the decimation period, thus obtaining an output moving-picture bitstream having buffer occupancy adequate for the storage capacity of the buffer.

4. The bitstream switching method according to claim 3 further comprising the step of detecting motion activity on the successive moving-picture bitstream, the motion activity being used for setting the decimation rate.

* * * * *